(12) United States Patent
Sugimoto et al.

(10) Patent No.: US 12,318,930 B2
(45) Date of Patent: Jun. 3, 2025

(54) MODULAR ROBOT

(71) Applicants: The Ritsumeikan Trust, Kyoto (JP); KYB Corporation, Tokyo (JP)

(72) Inventors: Shunichi Sugimoto, Kakogawa (JP); Sang-Ho Hyon, Kyoto (JP); Yasushi Saitou, Nagano (JP); Sadayuki Kamikura, Nagano (JP); Yuji Fukuzawa, Nagano (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 18/245,474

(22) PCT Filed: Oct. 1, 2021

(86) PCT No.: PCT/JP2021/036512
§ 371 (c)(1),
(2) Date: Mar. 15, 2023

(87) PCT Pub. No.: WO2022/071598
PCT Pub. Date: Apr. 7, 2022

(65) Prior Publication Data
US 2023/0339101 A1    Oct. 26, 2023

(30) Foreign Application Priority Data
Oct. 2, 2020    (JP) .................................. 2020-167735

(51) Int. Cl.
*B25J 9/10*    (2006.01)
(52) U.S. Cl.
CPC ..................... *B25J 9/106* (2013.01)
(58) Field of Classification Search
CPC ............... B25J 9/106; B25J 9/144; B25J 9/20
See application file for complete search history.

(56) References Cited

U.S. PATENT DOCUMENTS

| | | | |
|---|---|---|---|
| 9,561,595 B1* | 2/2017 | Dellon | F16H 25/186 |
| 9,731,416 B1* | 8/2017 | Saunders | B25J 9/14 |
| 2008/0069679 A1 | 3/2008 | Shimada | |
| 2011/0196509 A1* | 8/2011 | Jansen | B25J 17/0241 |
| | | | 91/499 |
| 2016/0152302 A1* | 6/2016 | Nishino | B62M 25/08 |
| | | | 701/2 |

FOREIGN PATENT DOCUMENTS

| | | | | |
|---|---|---|---|---|
| CN | 106695777 A | * | 5/2017 | |
| EP | 3311961 A1 | * | 4/2018 | .......... B25J 19/0012 |
| JP | 2015-036566 A | | 2/2015 | |
| KR | 20130029625 A | | 3/2013 | |
| WO | 2007/034561 A1 | | 3/2007 | |
| WO | WO-2012124853 A1 | * | 9/2012 | ............ B25J 9/0006 |
| WO | WO-2020123833 A1 | * | 6/2020 | |
| WO | WO-2020262700 A1 | * | 12/2020 | ............... A61H 3/00 |

OTHER PUBLICATIONS

S. Sugimoto, et al., "Development of a hydraulic robot that can be disassembled and assembled easily using a single-joint module", The 37th Annual Conference of the Robotics Society of Japan, Sep. 3, 2019; with concise explanation.

* cited by examiner

*Primary Examiner* — Bobby Rushing, Jr.
(74) *Attorney, Agent, or Firm* — Rabin & Berdo, P.C.

(57) ABSTRACT

A module robot includes a first link, a second link movably linked to the first link, and a fluid pressure cylinder configured to move the first link and the second link relative to each other, wherein the first link has a cylinder block in which a cylinder chamber of the fluid pressure cylinder is formed.

11 Claims, 13 Drawing Sheets

MODULAR ROBOT

TECHNICAL FIELD

The present invention relates to a module robot.

BACKGROUND ART

WO2007/034561 discloses a robot arm having a plurality of arm forming members. The arm forming members are respectively driven by arm driving devices, and the arm driving devices are each provided with a rod and a main body portion that moves the rod in the axial direction.

SUMMARY OF INVENTION

The robot arm described in WO2007/034561 is configured by having the arm forming members that form links and the arm driving devices that respectively drive the arm forming members, and so, a large number of components are used and the structure thereof is complex.

An object of the present invention is to provide a module robot having a simple construction.

According to one aspect of the present invention, a module robot includes a first link, a second link movably linked to the first link, and a fluid pressure cylinder configured to move the first link and the second link relative to each other, wherein the first link has a cylinder block in which a cylinder chamber of the fluid pressure cylinder is formed.

DESCRIPTION OF EMBODIMENTS

In the following, a module robot 100 according to the embodiment of the present invention will be described with reference to the drawings.

Figure 1:
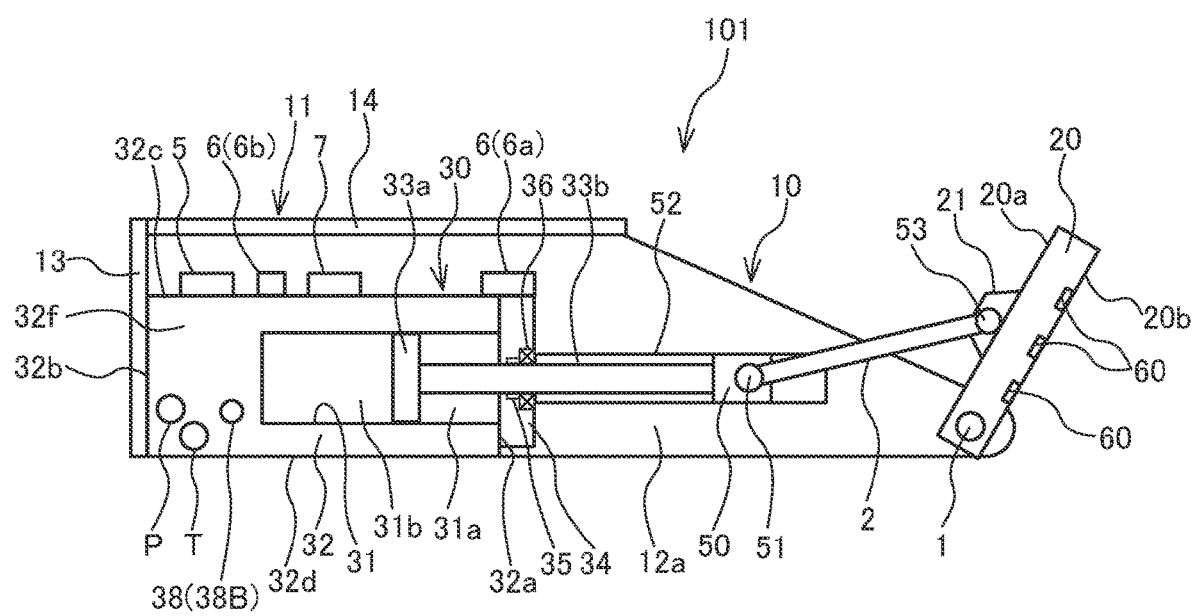
FIG. 1 is a schematic side view of a module according to an embodiment of the present invention.
Figure 2:
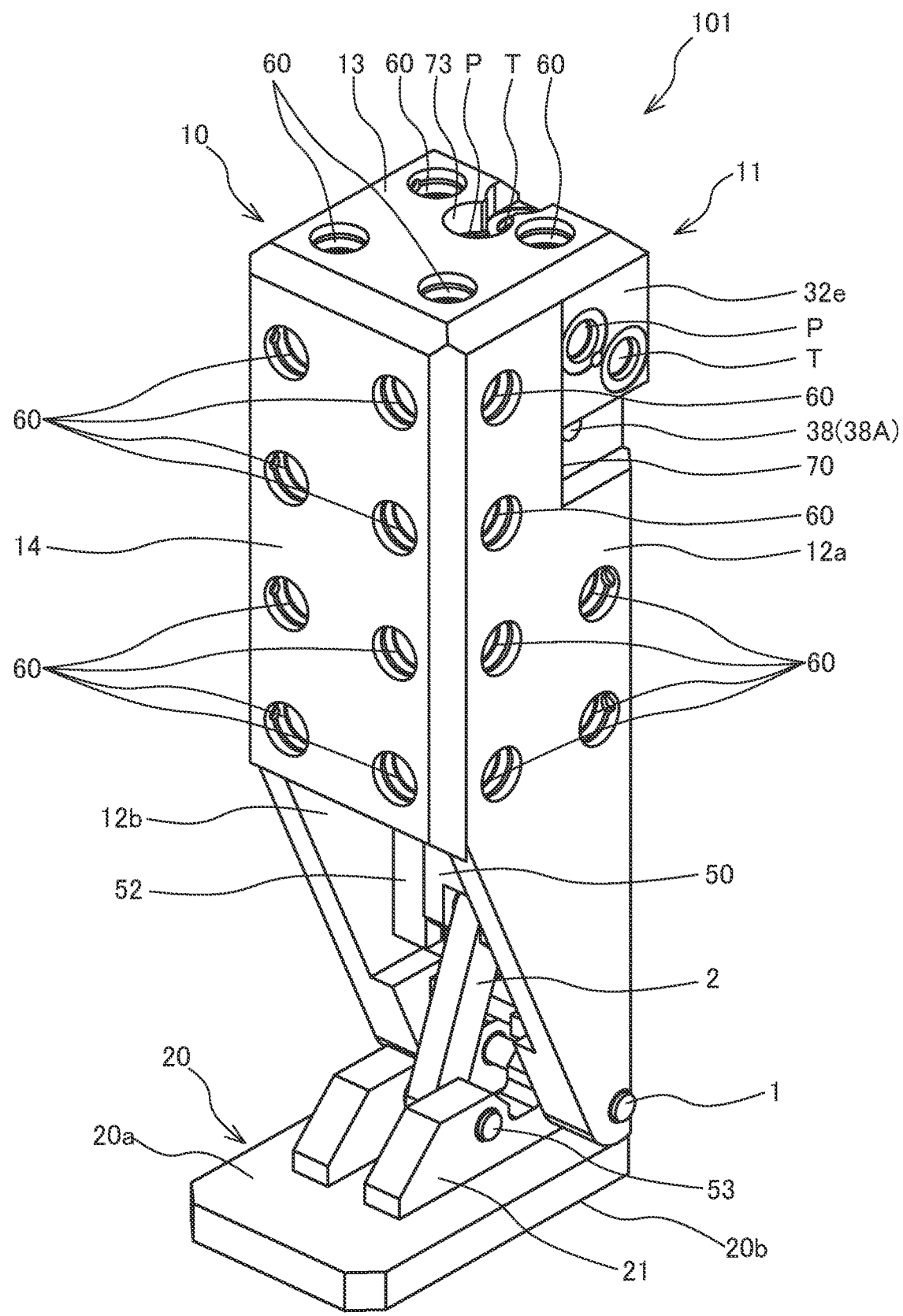
FIG. 2 is a perspective view of the front surface side of the module according to the embodiment of the present invention.
Figure 3:
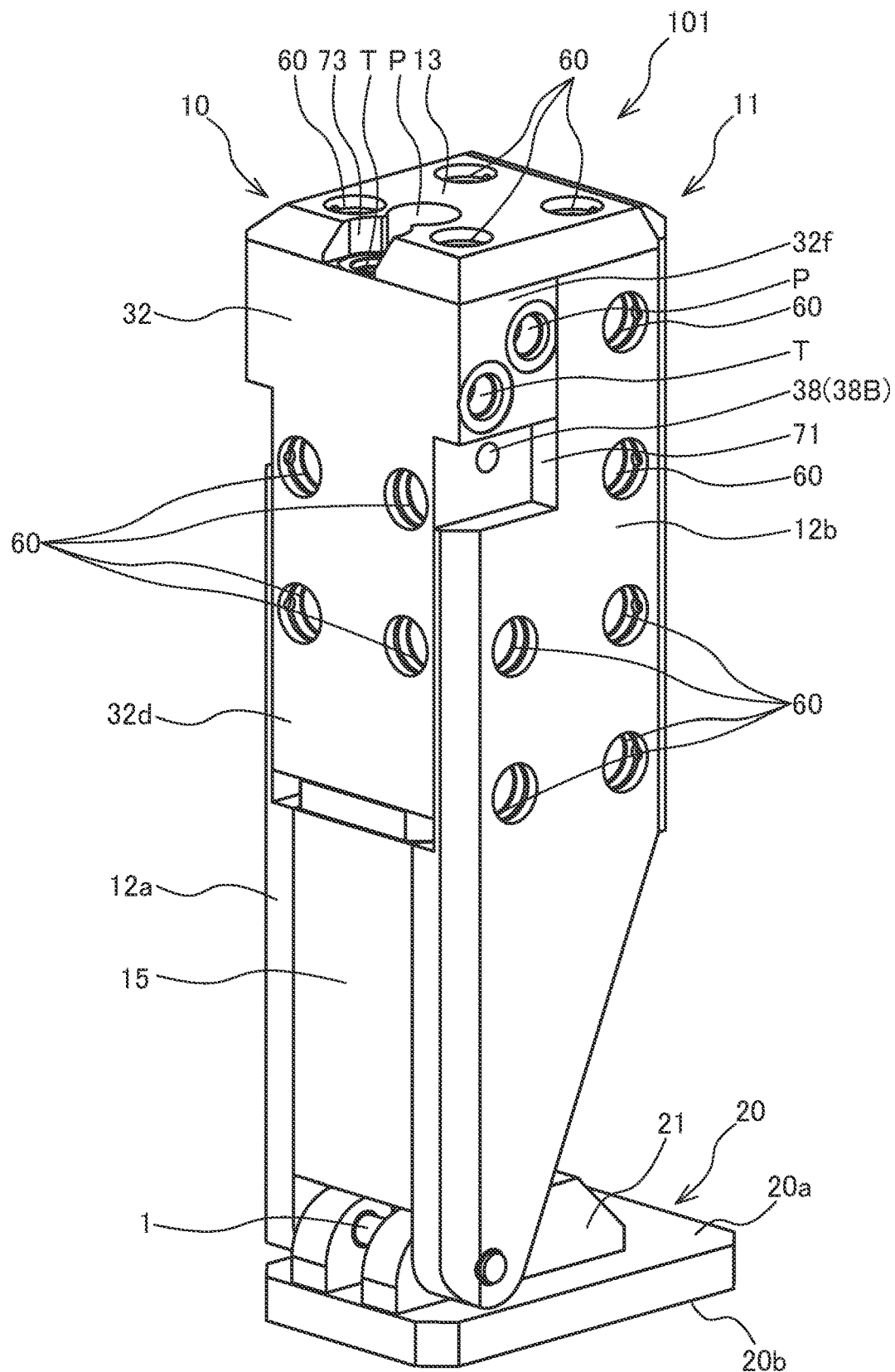
FIG. 3 is a perspective view of the back surface side of the module according to the embodiment of the present invention.

The module robot 100 (see FIG. 9) is configured by coupling a plurality of modules 101 shown in FIGS. 1 to 3.

Figure 4:
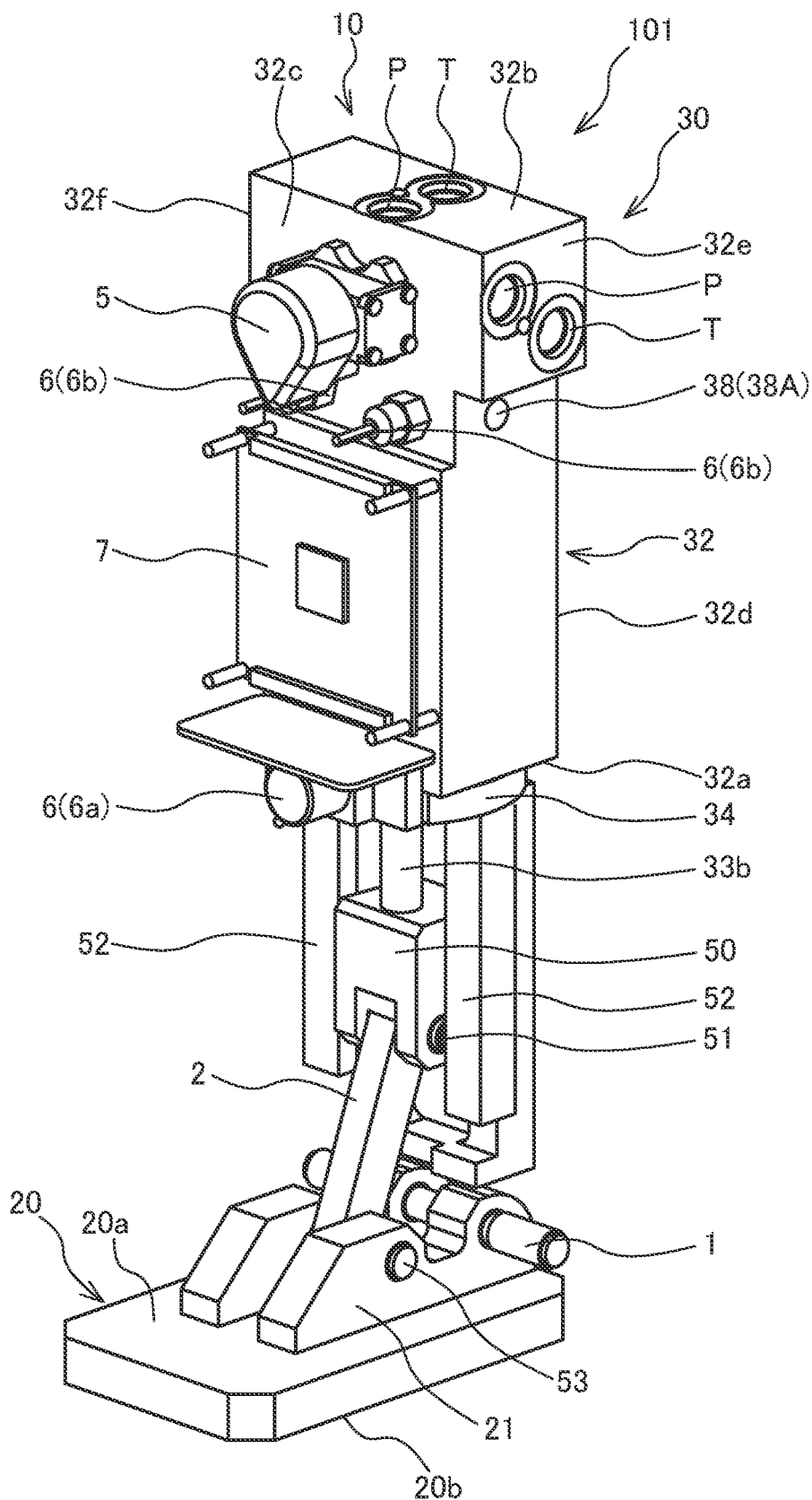
FIG. 4 is a perspective view of the front surface side of the module according to the embodiment of the present invention, and is a diagram in a state in which respective plates of a first link are removed.

The module 101 will be described first with reference to FIGS. 1 to 5. FIG. 1 is a schematic side view of the module 101, FIG. 2 is a perspective view of the front surface side of the module 101, FIG. 3 is a perspective view of the back surface side of the module 101, FIG. 4 is a perspective view of the front surface side of the module 101, and is a diagram in a state in which respective plates of a first link 10 are removed, and FIG. 5 is a system configuration diagram of the module robot 100 and the module 101.

The module 101 includes the first link 10, a second link 20 that is movably linked to the first link 10, and a hydraulic cylinder 30 that moves the first link 10 and the second link 20 relative to each other. The hydraulic cylinder 30 corresponds to a fluid pressure cylinder and a liquid pressure cylinder described in the claims.

The first link 10 and the second link 20 are rotatably linked each other via a rotation shaft 1. A third link 2 is rotatably linked to the hydraulic cylinder 30 and the second link 20.

Figure 5:
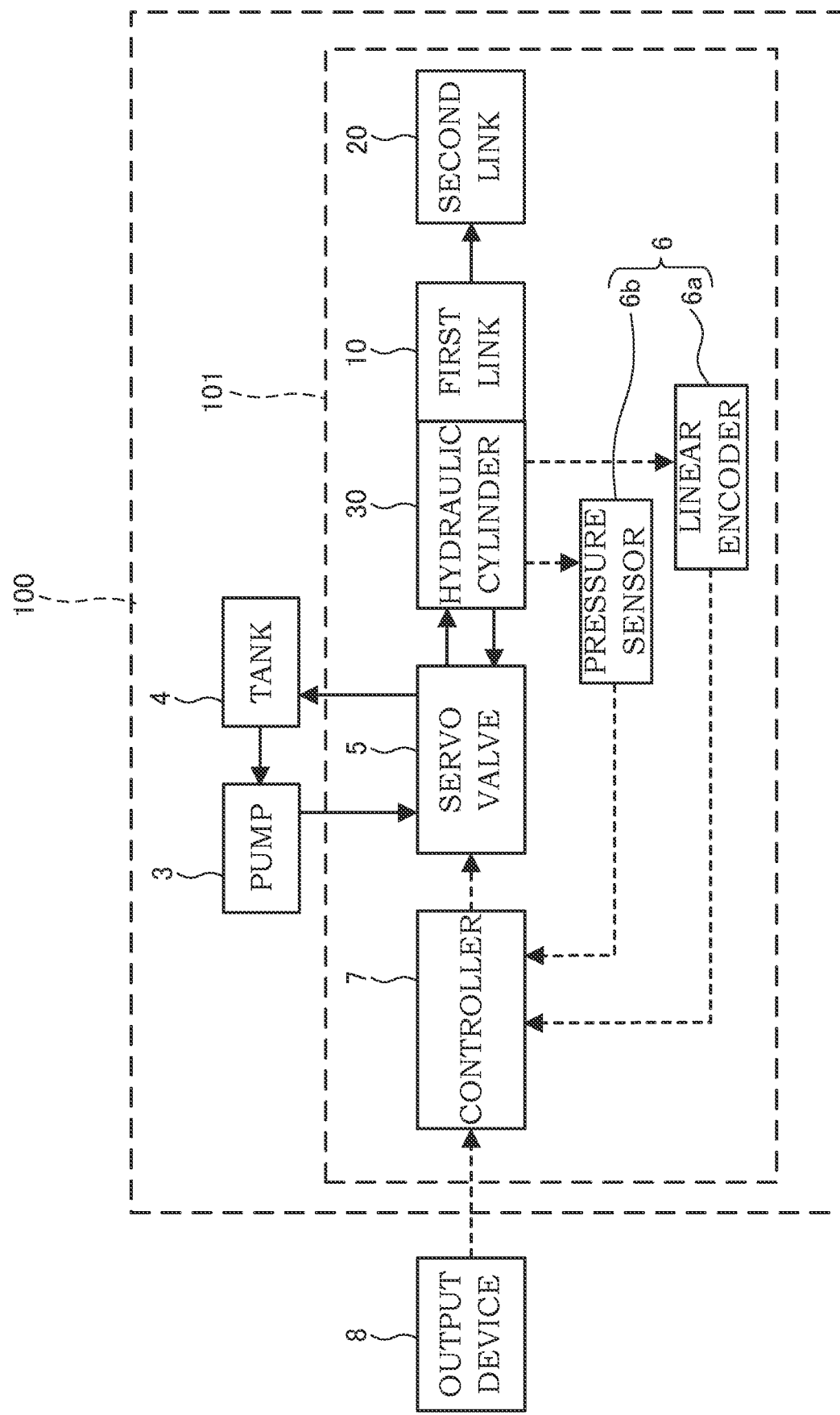
FIG. 5 is a system configuration diagram of a module robot and the module.

The hydraulic cylinder 30 is an actuator that is extended/contracted by working oil (working fluid) supplied from a pump 3 serving as a liquid pressure source (see FIG. 5). The hydraulic cylinder 30 has a cylinder block 32 in which a cylinder chamber 31 is formed, a piston 33a that is freely slidably inserted into the cylinder chamber 31 and that divides the cylinder chamber 31 into a rod side chamber 31a and an anti-rod side chamber 31b, and a piston rod 33b one end of which is linked to the piston 33a and the other end of which extends from the cylinder chamber 31 to the outside.

The cylinder block 32 is accommodated in a housing 11 of the first link 10 and is fixed to the housing 11 so as not to be rotatable. In other words, the hydraulic cylinder 30 is coupled with the first link 10 so as not to be rotatable. The cylinder block 32 is formed to have a substantially rectangular block shape, and the cylinder chamber 31 and oil passages, which will be described later, that communicates with the cylinder chamber 31 are formed inside the cylinder block 32. The cylinder chamber 31 is formed as a columnar shaped hole that opens at an end surface 32a of the cylinder block 32. A cylinder head 34 that closes the opening of the cylinder chamber 31 and through which the piston rod 33b is inserted is provided on the end surface 32a of the cylinder block 32. The cylinder head 34 is provided with a bearing 35 that supports the piston rod 33b in a freely slidable manner and a seal member 36 that prevents leakage of the working oil from the cylinder chamber 31.

As shown in FIGS. 1 and 4, a slider 50 is connected to a tip end of the piston rod 33b, and the slider 50 is rotatably linked to one end of the third link 2 via a rotation shaft 51. The slider 50 is arranged between a pair of linear guides 52 that are provided in the housing 11 so as to extend along the axial direction of the piston rod 33b, and the slider 50 is moved by being guided by the linear guides 52. The other end of the third link 2 is rotatably linked to the second link 20 via a rotation shaft 53.

The hydraulic cylinder 30 is contracted as the working oil is supplied from the pump 3 to the rod side chamber 31a and as the working oil in the anti-rod side chamber 31b is discharged to a tank 4 (see FIG. 5). On the other hand, the hydraulic cylinder 30 is extended as the working oil is supplied from the pump 3 to the anti-rod side chamber 31b and as the working oil in the rod side chamber 31a is discharged to the tank 4. As the hydraulic cylinder 30 is extended/contracted, the linear motion of the piston rod 33b is converted to the rotational motion of the second link 20 via the third link 2, and the first link 10 and the second link 20 are rotated about the rotation shaft 1 in a relative manner. As described above, by driving the hydraulic cylinder 30, the first link 10 and the second link 20 can be rotated relative to each other. The module 101 has a rotational degree of freedom of one-degree of freedom about the rotation shaft 1, and the first link 10, the second link 20, and the hydraulic cylinder 30 are linked so as to achieve one-degree of freedom.

Figure 6:
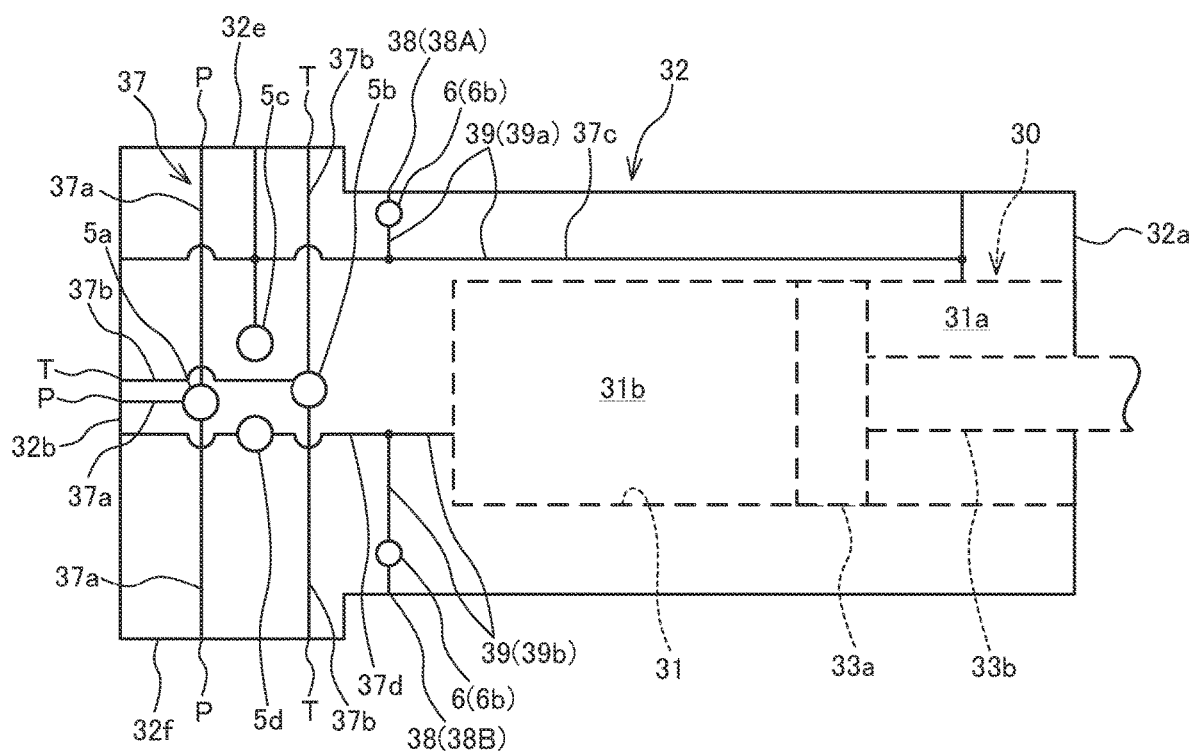
FIG. 6 is a diagram schematically showing ports and oil passages formed in a cylinder block.

Next, the ports and the oil passages that are formed in the cylinder block 32 will be described in detail with main reference to FIG. 6. FIG. 6 is a diagram schematically showing the ports and the oil passages formed in the cylinder block 32.

Pump ports P that can be connected to the pump 3 and tank ports T that can be connected to the tank 4 are formed by opening at outer surfaces of the cylinder block 32. In this embodiment, the pump ports P and the tank ports T are respectively formed on three surfaces among the plurality of outer surfaces of the cylinder block 32. One of the pump ports P formed on the three surfaces is connected to the pump 3 through a hose and a piping, and the pump ports P that are not used are closed by plugs. Similarly, one of the tank ports T formed on the three surfaces is connected to the tank 4 through a hose and a piping, and the tank ports T that are not used are closed by plugs.

The cylinder block 32 is provided with a servo valve 5 as a control valve (see FIG. 4). The servo valve 5 controls the communication between the cylinder chamber 31 and the pump ports P/the tank ports T. The servo valve 5 has a supply port 5a that communicates with the pump ports P, a discharge port 5b that communicates with the tank ports T, a rod side port 5c that communicates with the rod side chamber 31a, and an anti-rod side port 5d that communicates with the anti-rod side chamber 31b. The servo valve 5 switches the communication between the supply port 5a/the discharge port 5b and the rod side port 5c/the anti-rod side port 5d by changing its position.

The cylinder block 32 is formed with oil passages 37 that connect the pump ports P and the tank ports T with the cylinder chamber 31. The oil passages 37 have supply passages 37a that connect the pump ports P with the supply port 5a of the servo valve 5, discharge passages 37b that connect the tank ports T with the discharge port 5b of the servo valve 5, a rod side passage 37c that connects the rod side port 5c of the servo valve 5 with the rod side chamber 31a, and an anti-rod side passage 37d that connects the anti-rod side port 5d of the servo valve 5 with the anti-rod side chamber 31b.

In a case in which the supply port 5a is communicated with the rod side port 5c and the discharge port 5b is communicated with the anti-rod side port 5d by the servo valve 5, the working oil is supplied from the pump port P to the rod side chamber 31a and the working oil in the anti-rod side chamber 31b is discharged to the tank port T, and thereby, the hydraulic cylinder 30 is contracted. On the other hand, in a case in which the supply port 5a is communicated with the anti-rod side port 5d and the discharge port 5b is communicated with the rod side port 5c by the servo valve 5, the working oil is supplied from the pump port P to the anti-rod side chamber 31b and the working oil in the rod side chamber 31a is discharged to the tank ports T, and thereby, the hydraulic cylinder 30 is extended.

In addition to the pump ports P and the tank ports T, supply-discharge ports 38 that can be connected to the pump 3 and the tank 4 in a selective manner are formed by opening at the outer surfaces of the cylinder block 32. The supply-discharge ports 38 have a first supply-discharge port 38A that communicates with the rod side chamber 31a and a second supply-discharge port 38B that communicates with the anti-rod side port 5d. The first supply-discharge port 38A and the second supply-discharge port 38B are connected to control valves (not shown) provided outside the module 101 via a hose and a piping. By operation of the control valves, one of the first supply-discharge port 38A and the second supply-discharge port 38B is connected to the pump 3, and the other thereof is connected to the tank 4. In this embodiment, the first supply-discharge port 38A and the second supply-discharge port 38B are each formed at a single surface among the plurality of outer surfaces of the cylinder block 32.

The cylinder block 32 is formed with, in addition to the oil passages 37, oil passages 39 that connect the supply-discharge ports 38 with the cylinder chamber 31. The oil passages 39 have a first supply-discharge passage 39a that connects the first supply-discharge port 38A with the rod side chamber 31a and a second supply-discharge passage 39b that connects the second supply-discharge port 38B with the anti-rod side chamber 31b. A part of the first supply-discharge passage 39a and a part of the rod side passage 37c are shared with each other, and a part of the second supply-discharge passage 39b and a part of the anti-rod side passage 37d are shared with to each other.

In a case in which the first supply-discharge port 38A is connected to the pump 3 and the second supply-discharge port 38B is connected to the tank 4, the working oil is supplied to the rod side chamber 31a and the working oil in the anti-rod side chamber 31b is discharged, and thereby, the hydraulic cylinder 30 is contracted. On the other hand, in a case in which the second supply-discharge port 38B is connected to the pump 3 and the first supply-discharge port 38A is connected to the tank 4, the working oil is supplied to the anti-rod side chamber 31b and the working oil in the rod side chamber 31a is discharged, and thereby, the hydraulic cylinder 30 is extended.

As described above, the cylinder block 32 is formed with the pump ports P and the tank ports T, and the supply-discharge ports 38. In a case in which the pump ports P and the tank ports T are used, the supply-discharge ports 38 are closed by plugs, and in a case in which the supply-discharge ports 38 are used, the pump ports P and the tank ports T are closed by plugs.

In addition, as described above, the cylinder chamber 31 is formed inside the cylinder block 32 having a block shape, and the cylinder block 32 is formed with oil passages 37c, 37d, 39a and 39b that are connected to the cylinder chamber 31, the oil passages 37a that connect the servo valve 5 with the pump 3, and the oil passages 37b that connect the servo valve 5 with the tank 4. Therefore, because there is no need to provide the hose and the piping to connect the cylinder chamber 31 with the servo valve 5, it is possible to make the module 101 to have a simple structure.

The cylinder block 32 is formed of a metal or a resin depending on the rigidity required for applications of the module 101. Although the cylinder block 32 has a complex structure in which the cylinder chamber 31 and the oil passages 37 and 39 are formed inside thereof, it is possible to easily manufacture the cylinder block 32 by using a three-dimensional printer for formation of the cylinder block 32.

As shown in FIG. 4, the module 101 further has the servo valve 5, sensors 6 each serving as a state-quantity detector that detects a state quantity of the module 101, and a controller 7 that controls motion of the module 101 by controlling operation of the servo valve 5 on the basis of the detection result from the sensor 6. As described above, the servo valve 5, the sensor 6, and the controller 7 are provided for every module 101, and the hydraulic cylinder 30 is controlled independently. The servo valve 5, the sensor 6, and the controller 7 are provided on the outer surface of the cylinder block 32 and are accommodated in the housing 11.

In this embodiment, the module 101 has: as the sensor 6, a linear encoder 6a that detects a stroke amount of the hydraulic cylinder 30 as the state quantity of the module 101 and pressure sensors 6b that detect pressure in the hydraulic cylinder 30 as the state quantity of the module 101.

The linear encoder 6a detects the stroke amount of the piston rod 33b. The detection result from the linear encoder 6a is used for a position control of the module 101. The controller 7 computes a relative rotational angle between the first link 10 and the second link 20 on the basis of the detection result from the linear encoder 6a. Instead of providing the linear encoder 6a, a rotary encoder may be provided on the rotation shaft 1 to detect the relative rotational angle between the first link 10 and the second link 20.

As the pressure sensors 6b, two pressure sensors, a pressure sensor that detects a pressure in the rod side chamber 31a and a pressure sensor that detects a pressure in the anti-rod side chamber 31b, are provided. The detection result from the pressure sensors 6b is used for a load control of the module 101. Instead of providing the pressure sensors 6b, a load sensor for detecting the load acting on the hydraulic cylinder 30 as the state quantity of the module 101 may be provided on the hydraulic cylinder 30.

The state quantity of the module 101 to be detected by the sensors 6 includes the above described the stroke amount of the hydraulic cylinder 30, the relative rotational angle between the first link 10 and the second link 20, the pressure in the hydraulic cylinder 30, and the load acting on the hydraulic cylinder 30. In addition, the state quantity of the module 101 may include the stroke speed of the hydraulic cylinder 30, a flow amount of the working oil to be supplied to the hydraulic cylinder 30, and so forth. The stroke speed of the hydraulic cylinder 30 may also be computed from the detection result from the linear encoder 6a, and the flow amount of the working oil to be supplied to the hydraulic cylinder 30 may be detected by providing a flow amount sensor on the hydraulic cylinder 30. The state quantity of the module 101 to be detected by the sensors 6 may be selected appropriately in accordance with a motion control of the module 101.

Next, system configurations of the module robot 100 and the module 101 will be described with reference to FIG. 5.

The module 101 is configured by integrating the following respective components into a module: the first link 10, the second link 20, the hydraulic cylinder 30, the servo valve 5, the sensors 6, and the controller 7. In addition to the module 101, the module robot 100 includes the pump 3 for supplying the working oil to the hydraulic cylinder 30 and the tank 4 for storing the working oil.

The controller 7 computes deviation between a command signal output from an output device 8 and a feedback signal from the sensors 6 and controls the servo valve 5 such that the deviation becomes zero. As described above, the controller 7 performs a feedback control on the basis of the detection result from the sensor 6. The output device 8 is connected to the controller 7 in a wired or wireless manner, and the controller 7 is also connected to the servo valve 5 in a wired or wireless manner.

The command signal that is output from the output device 8 is information defining the motion of the module 101. The command signal that is output from the output device 8 is the information directly input to the output device 8, the information transmitted to the output device 8 through a transmission circuit, the information read out from a storage medium, and so forth.

Next, the configurations of the first link 10 and the second link 20 will be described in detail with main reference to FIGS. 1 to 4.

The cylinder block 32 is formed to have a substantially rectangular block shape, and has, as the outer surfaces, six surfaces: the end surface 32a at which the opening of the cylinder chamber 31 is formed; an end surface 32b on the opposite side from the end surface 32a; a front surface 32c on which the servo valve 5, the sensor 6, and the controller 7 are provided; a back surface 32d on the opposite side from the front surface 32c; and a pair of the side surfaces 32e and 32f. In FIGS. 4 and 6, although the side surfaces 32e and 32f are each formed to have a step, they may have a flat surface.

The pump ports P and the tank ports T are formed in the end surface 32b and the pair of side surfaces 32e and 32f among the outer surfaces of the cylinder block 32. In addition, the first supply-discharge port 38A is formed in the side surface 32e among the outer surfaces of the cylinder block 32, and the second supply-discharge port 38B is formed in the side surface 32f among the outer surfaces of the cylinder block 32.

The housing 11 of the first link 10 has: a pair of first plates 12a and 12b that are provided so as to be in parallel with each other by being fixed by being brought into surface contact with the pair of side surfaces 32e and 32f of the cylinder block 32, respectively; a second plate 13 that is fixed by being brought into surface contact with the end surface 32b of the cylinder block 32; and a third plate 14 that is provided such that a predetermined gap is formed with the front surface 32c of the cylinder block 32. The first plates 12a and 12b, the second plate 13, and the third plate 14 are connected with each other by a joint tool, such as screws, etc. In FIG. 1, a state in which the first plate 12b to be fixed to the side surface 32f of the cylinder block 32 is removed is shown.

The rotation shaft 1 is provided over between both of the pair of first plates 12a and 12b. The first plate 12a is formed with a cut-out portion 70 through which the pump port P, the tank port T, and the first supply-discharge port 38A are exposed, and the first plate 12b is formed with a cut-out portion 71 through which the pump port P, the tank port T, and the second supply-discharge port 38B are exposed. In addition, the second plate 13 is also formed with a cut-out portion 72 through which the pump port P and the tank port T are exposed. As described above, the pump ports P and the tank ports T are formed in three surfaces among the outer surfaces of the first link 10, and the first supply-discharge port 38A and the second supply-discharge port 38B are each formed in a single surface among the outer surfaces of the first link 10.

The first plates 12a and 12b, the second plate 13, and the third plate 14 are formed of a metal or a resin depending on the rigidity required for applications of the module 101. The first plates 12a and 12b, the second plate 13, and the third plate 14 may be partially formed of the metal, and the rest thereof may be formed by the resin.

In the first plates 12a and 12b, the second plate 13, and the third plate 14, a plurality of joint holes 60, through which the joint tools for coupling the modules 101 together are respectively inserted, are formed at equal intervals from each other. In this embodiment, six, four, and eight joint holes 60 are formed in the first plates 12a and 12b, the second plate 13, and the third plate 14, respectively. The plurality of joint holes 60 may not be formed at equal intervals from each other.

As shown in FIG. 3, a plate is not fixed to the back surface 32d of the cylinder block 32, and the back surface 32d is formed so as to be exposed. The back surface 32d of the cylinder block 32 forms, together with the plates 12a, 12b, 13, and 14, a part of the housing 11 of the first link 10. Similarly to the plates 12a, 12b, 13, and 14, in the back surface 32d, the plurality of joint holes 60, through which the joint tools for coupling the modules 101 together are respectively inserted, are formed at equal intervals from each other. In this embodiment, four joint holes are formed in the back surface 32d. A plate 15 is provided between the first plates 12a and 12b so as to be aligned with the back surface 32d of the cylinder block 32. The plate 15 is provided to close an opening of the first link 10 on the back surface side. The plate 15 is not an essential configuration, and it is possible to omit it.

The cylinder block 32 is fixed to the first plates 12a and 12b that are provided with the rotation shaft 1, and the cylinder block 32 configures a part of the first link 10. In other words, the first link 10 has the cylinder block 32 that is a component of the hydraulic cylinder 30. The cylinder block 32 has two functions: a function in which the cylinder chamber 31 and the oil passages 37 and 39 are formed inside; and a function of serving as the link. Therefore, it is possible to reduce the number of components of the module 101, and at the same time, it is possible to make the module 101 to have a simple structure.

In this embodiment, although the first plates 12a and 12b, the second plate 13, and the third plate 14 are formed as separate bodies and are connected with each other, they may be formed as a single component that is formed in an integrated manner. In addition, the cylinder block 32, the first plates 12a and 12b, and the second plate 13 may be formed as a single component that is formed in an integrated manner. In other words, it may be possible to form a single cylinder block that is configured with the cylinder block 32, the first plates 12a and 12b, and the second plate 13 in this embodiment. In this case, the third plate 14 functions as a lid of the housing 11, and only the third plate 14 is formed as a separate component.

The second link 20 is formed to have a flat plate shape. Brackets 21 that freely rotatably support the rotation shaft 53 and the rotation shaft 1 are provided on a front surface 20a of the second link 20. The plurality of joint holes 60, through which the joint tools for coupling the modules 101 with each other are respectively inserted, are formed at equal intervals from each other in a reverse surface 20b of the second link 20 (see FIG. 1). The gaps between the plurality of joint holes 60 formed in the first link 10 are the same as the gaps between the plurality of joint holes 60 formed in the second link 20. The plurality of joint holes 60 in the second link 20 may not be formed at equal intervals from each other. In addition, the shape of the second link 20 is not limited to the flat plate shape, and the second link 20 may be formed to have the shape suitable for the application of the module 101.

Next, the coupling of the modules 101 with each other will be described in a detail with main reference to FIGS. 7 to 9.

Two modules 101 are coupled by connecting the first link 10 or the second link 20 of a first module 101A, which is one of the two modules 101, with the first link 10 or the second link 20 of a second module 101B, which is the other of the two modules 101. Specifically, any one of the plates 12a, 12b, 13, and 14, the back surface 32d of the cylinder block 32, and the reverse surface 20b of the second link 20 of the first module 101A is used as a coupling plate 80A, and any one of the plates 12a, 12b, 13, and 14, the back surface 32d of the cylinder block 32, and the reverse surface 20b of the second link 20 of the second module 101B is used as a coupling plate 80B. Then, in a state in which the coupling plate 80A and the coupling plate 80B are brought into surface contact with each other, the joint tool is inserted over between the joint hole 60 of the coupling plate 80A and the joint hole 60 of the coupling plate 80B, thereby connecting the coupling plate 80A with the coupling plate 80B. The joint tool is a dowel member having a columnar shape that is forcedly fit into both of the joint hole 60 of the coupling plate 80A and the joint hole 60 of the coupling plate 80B, for example. In the above, the plurality of joint holes 60 formed in the first link 10 are arranged at equal intervals from each other, and the plurality of joint holes 60 formed in the second link 20 are arranged at equal intervals from each other, and in addition, the gaps between the plurality of joint holes 60 formed in the first link 10 are the same as the gaps between the plurality of joint holes 60 formed in the second link 20. Therefore, it is possible to easily connect the first link 10 or the second link 20 of the first module 101A with the first link 10 or the second link 20 of the second module 101B. The two modules 101 may not be coupled directly, and they may be coupled via an attachment. In such a case, the attachment is first interposed between the coupling plate 80A and the coupling plate 80B, and then, the coupling plate 80A is connected to the attachment by the joint tool, and the coupling plate 80B is connected to the attachment by the joint tool.

Coupling examples of the two modules 101A and 101B configuring the module robot 100 will be described with reference to FIGS. 7 and 8. With FIGS. 7 and 8, a case in which the two mutually identical modules 101A and 101B are coupled will be described. In this description, the phrase "the identical modules" means that the components configuring the modules are the same with each other, and that the shapes and dimensions of the components are the same with each other. In other words, the identical modules can also be referred to as identically-standardized items.

Figure 7:
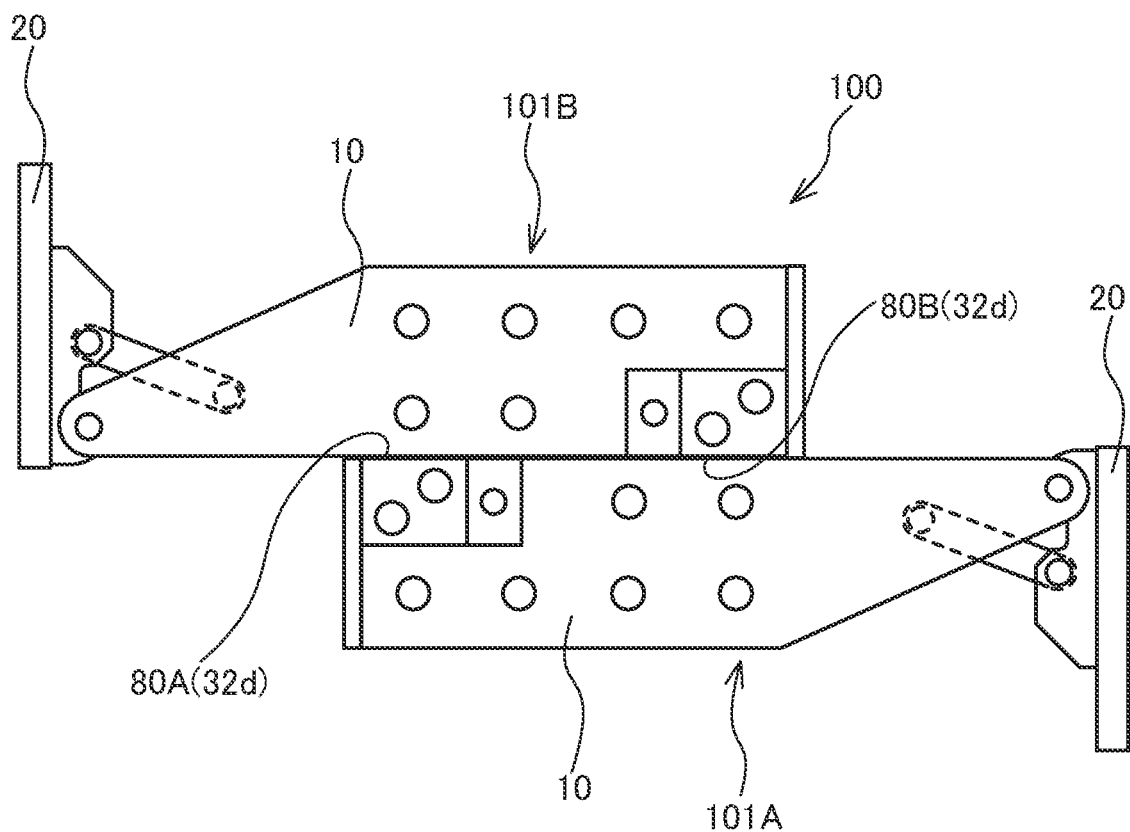
FIG. 7 is a diagram showing a coupling example of the modules.

FIG. 7 shows an example of a back surface coupling in which the back surfaces of the first module 101A and the second module 101B are coupled with each other by respectively setting both of the coupling plate 80A of the first module 101A and the coupling plate 80B of the second module 101B at the back surfaces 32d of the cylinder blocks 32. Because the cylinder block 32 configures the part of the first link 10, and the joint holes 60 are formed in the back surface 32d, it is possible to connect the cylinder block 32 of the first module 101A with the first link 10 or the second link 20 of the second module 101B. As described above, it is possible to connect the first link 10 with the second link 20 by using the cylinder block 32 configuring the part of the first link 10.

Figure 8:
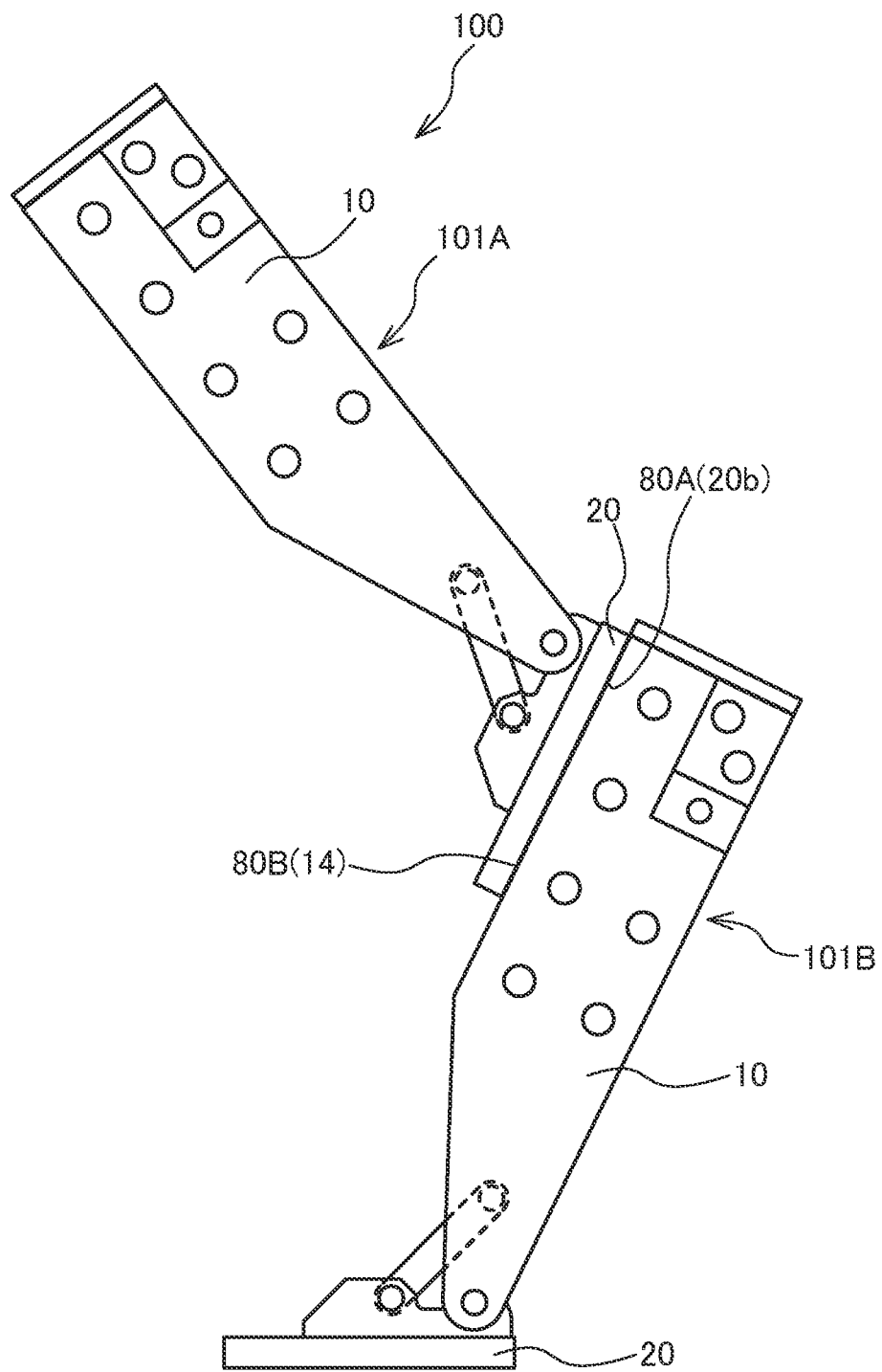
FIG. 8 is a diagram showing a coupling example of the modules.

FIG. 8 shows an example of a series coupling in which the first module 101A and the second module 101B are coupled in series by setting the coupling plate 80A of the first module 101A at the reverse surface 20b of the second link 20 and by setting the coupling plate 80B of the second module 101B at the third plate 14 of the first link 10. As another example of the series coupling, the first module 101A may be coupled with the second module 101B by setting the coupling plate 80A of the first module 101A at the reverse surface 20b of the second link 20 and by setting the coupling plate 80B of the second module 101B at the second plate 13 of the first link 10. In addition, the first module 101A may be coupled with the second module 101B by setting both of the coupling plate 80A of the first module 101A and the coupling plate 80B of the second module 101B at the reverse surfaces 20b of the second links 20.

In the coupling examples shown in FIGS. 7 and 8, because the first module 101A and the second module 101B undergo the motion within the same plane, the module robot 100 undergoes, as a whole, a two dimensional motion. By coupling the first module 101A and the second module 101B by setting the coupling plate 80A of the first module 101A at the first plate 12a of the first link 10 and by setting the coupling plate 80B of the second module 101B at the back surface 32d of the cylinder block 32 of the first link 10, the module robot 100 undergoes, as a whole, a three dimensional motion.

Those described above are examples of the coupling method of the two modules 101A and 101B, and the two modules 101A and 101B can be freely coupled depending on the desired motion of the module robot 100. For example, the first module 101A and the second module 101B may be coupled in parallel in the same orientation by connecting the first plate 12a of the first link 10 of the first module 101A with the first plate 12b of the first link 10 of the second module 101B. In this case, the second links 20 of the first module 101A and the second module 101B may be coupled with a driving target, and the hydraulic cylinders 30 of the first module 101A and the second module 101B may be controlled in a synchronous manner, and thereby, it is possible to increase the output power of the module robot 100. In a case of the parallel coupling, the rotation shaft 1 may be shared.

Figure 9:
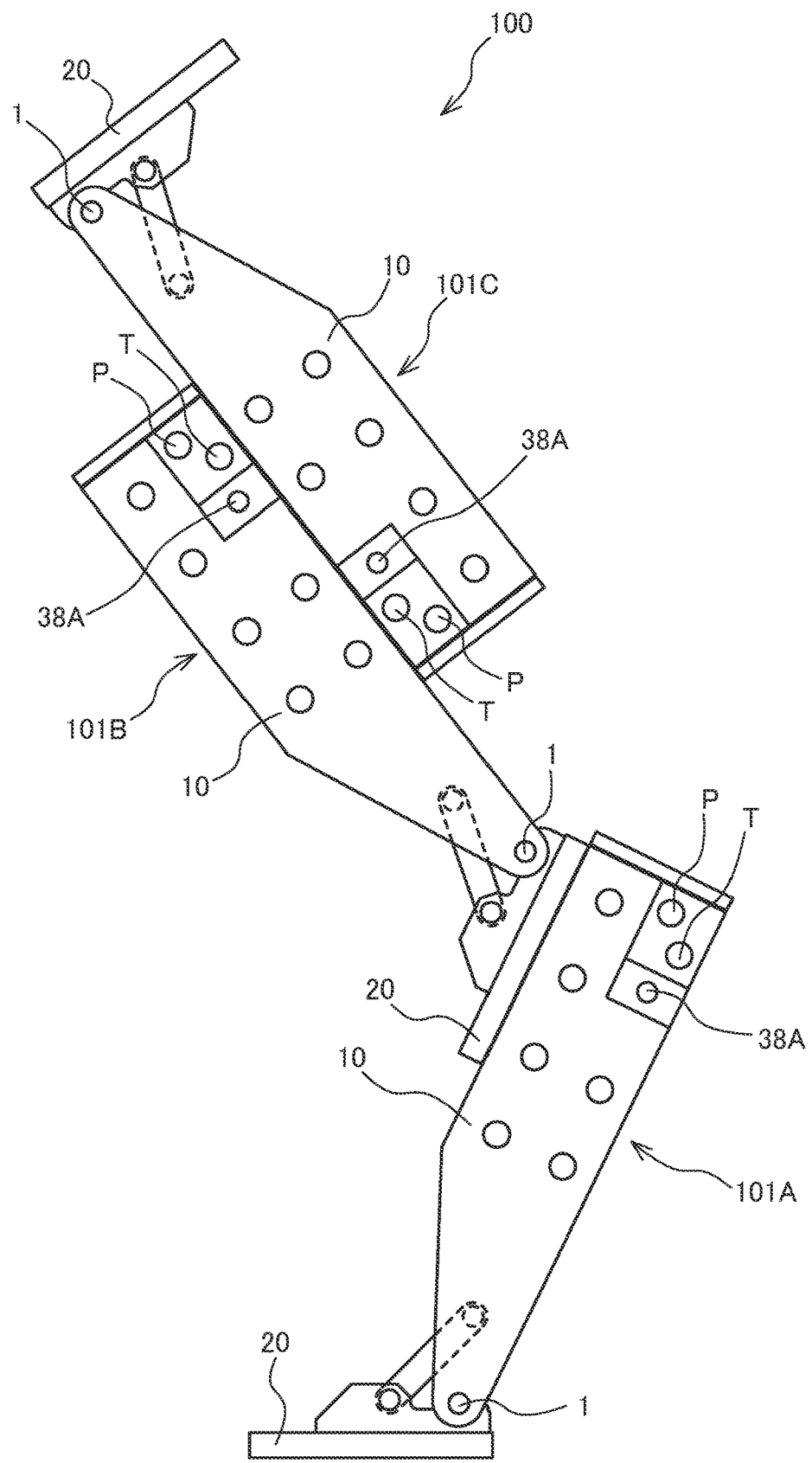
FIG. 9 is a side view of the module robot in which a leg portion is formed by coupling the modules.

Next, an example of the module robot 100 will be configuration with reference to FIG. 9. The module robot 100 shown in FIG. 9 shows the example in which a leg portion robot is configured by coupling three identical modules 101A, 101B, and 101C so as to correspond to an ankle joint, a knee joint, and a hip joint, respectively. Specifically, the rotation shafts 1 of the modules 101A, 101B, and 101C correspond to the ankle joint, the knee joint, and the hip joint, respectively. The second link 20 of the module 101A functions as a leg. In the module robot 100, each of the modules 101 configures a single joint module, and the module robot 100 has three degrees of freedom.

The module 101A and the module 101B are coupled by the series coupling as shown in FIG. 8, and the module 101B and the module 101C are coupled by the back surface coupling as shown in FIG. 7.

The respective pump ports P of the modules 101A, 101B, and 101C are connected in series by the hose and the piping, and any one of the pump ports P of the modules 101A, 101B, and 101C is connected to the pump 3. With such a configuration, the working oil supplied from the pump 3 is supplied to the respective pump ports P of the modules 101A, 101B, and 101C. In addition, the respective tank ports T of the modules 101A, 101B, and 101C are connected in series by the hose and the piping, and any one of the tank ports T of the modules 101A, 101B, and 101C is connected to the tank 4. With such a configuration, the respective tank ports T of the modules 101A, 101B, and 101C are connected to the tank 4.

Because the pump ports P and the tank ports T are formed on three surfaces among the outer surfaces of the first link 10, depending on the mutual coupling mode of the modules 101, it is possible to use the best suitable pump port P and tank port T by taking consideration of routing of the hose and the piping.

In addition, in a case in which the extension/contraction of the hydraulic cylinder 30 is controlled by using a control valve provided outside the module 101, but not using the servo valve 5, the pump ports P and the tank ports T are closed by the plugs, and the first supply-discharge port 38A and the second supply-discharge port 38B are connected to the control valve via the hose and the piping.

On the basis of the detection results from the linear encoders 6a, the respective controllers 7 of the modules 101A, 101B, and 101C respectively control the motions of the modules 101A, 101B, and 101C by extending/contracting the respective hydraulic cylinders 30 such that the relative rotational angles between the first links 10 and the second links 20 become the desired angles. As the motion of each of the modules 101A, 101B, and 101C is independently controlled, a posture of the module robot 100 is controlled.

In addition, the respective controllers 7 of the modules 101A, 101B, and 101C respectively control torque for the respective joints on the basis of the detection results from the pressure sensors 6b. For example, the controllers 13 perform a tare weight compensation control for controlling the respective hydraulic cylinders 30 such that the tare weight of the module robot 100 is cancelled out.

The module robot 100 is used as an autonomous walking robot or as a robot that assists the gait and the posture of a user by being worn by the user.

In addition, the module robot 100 may be used by fixing the second link 20 of the module 101A to a ground, a wall surface, or a base. In such a case, the second link 20 of the module 101A may be fixed to the ground, the wall surface, or the base via a base plate. The second link 20 of the module 101A is simply fixed to a front surface of the base plate in a detachable manner, and a reverse surface of the base plate is fixed to the ground, the wall surface, or the base by using bolts, etc.

The module robot 100 is not limited to the leg portion robot shown in FIG. 9. For example, the module robot 100 may be made to have other applications and functions by fixing the second link 20 of the module 101A to the ground or a foundation and by attaching a bucket, a rod, or a hand to the second link 20 of the module 101C as the attachment. In addition, it is possible to configure a humanoid robot or a centipede robot by further coupling the plurality of modules 101, in addition to the leg portion robot shown in FIG. 9. As described above, it is possible to easily configure various robots in accordance with the applications and the functions by only coupling the plurality of modules 101.

According to the above-described embodiment, following operational advantages are afforded.

It is possible to easily configure the module robot 100 that can adapt to a wide variety of applications by coupling the plurality of modules 101 each having the first link 10, the second link 20, and the hydraulic cylinder 30. In addition, because the module robot 100 can be configured only by coupling the plurality of modules 101, the assembly can be performed easily. Therefore, even when the module robot 100 is to be transported, it suffices to divide the module robot 100 into the respective modules 101, and thus, the assembly and the transportation thereof can be performed easily. Thus, it is possible to configure the module robot 100 that can adapt to a wide variety of applications and that can be assembled and transported with ease.

In addition, because the cylinder block 32, in which the cylinder chamber 31 of the hydraulic cylinder 30 is formed, configures the part of the first link 10, it is possible to achieve the module 101 with a simple structure, the number of components of which is reduced. Thus, it is possible to obtain the module robot 100 with a simple structure.

In addition, because a driving source of the module 101 is a hydraulic pressure, compared with a case in which the driving source is an electric motor, the output power of the module 101 relative to the module weight is high. Thus, even in a case in which the application of the module robot 100 requires a high output power, it is possible to prevent the increase in the size of the module robot 100. In addition, because the extension/contraction of the hydraulic cylinder 30 is controlled by the servo valve 5, it is possible to control the motion of the module 101 with a high accuracy.

Modifications of the above-mentioned embodiment will be described below. The modifications described below also fall within the scope of the present invention. It may be possible to combine the following modifications with the respective configurations in the above-mentioned embodiment, and it may also be possible to combine the following modifications with each other. In the descriptions of the following modifications, the descriptions will be made using the same reference signs for the same configurations with those in the above-mentioned embodiment.

(1) In the above-mentioned embodiment, a description has been given of the configuration in which the module 101 has one degree of freedom (the single joint). Instead of this configuration, the module may have a configuration with a plurality of degrees of freedom. When a plurality of degrees of freedom are to be achieved, it suffices to increase the number of the links or to change the hydraulic cylinder to a double-rod type.

(2) In the above-mentioned embodiment, a description has been given of the configuration in which the module 101 has the rotational degree of freedom. Instead of this configuration, the module may have a configuration with the translational degree of freedom. In this case, the hydraulic cylinder is provided between the first link and the second link that are freely slidably coupled with each other. As described above, the first link and the second link are not limited to the configuration in which they are rotatably linked each other, and it suffices that the first link and the second link are movably linked each other.

(3) In the above-mentioned embodiment, a description has been given of the configuration in which the mutually identical modules 101 are coupled together. Instead of this configuration, the modules to be coupled may not be identical (may not be those having the same standard). For example, the modules having the first links with different shapes and/or dimensions from each other may be coupled with each other, or the modules having the hydraulic cylinders with different stroke lengths from each other may be coupled with each other. In other words, the modules may be coupled freely in accordance with the desired motion of the module robot and/or the applications and functions of the module robot by preparing a plurality of modules with different standards. However, it is possible to manufacture the module robot with a lower cost by configuring the module robot by coupling the plurality of modules having the same standard.

(4) The third link 2 is not an essential component, and the piston rod 33b of the hydraulic cylinder 30 and the second link 20 may be coupled directly so as to be freely rotatable.

Figure 10:
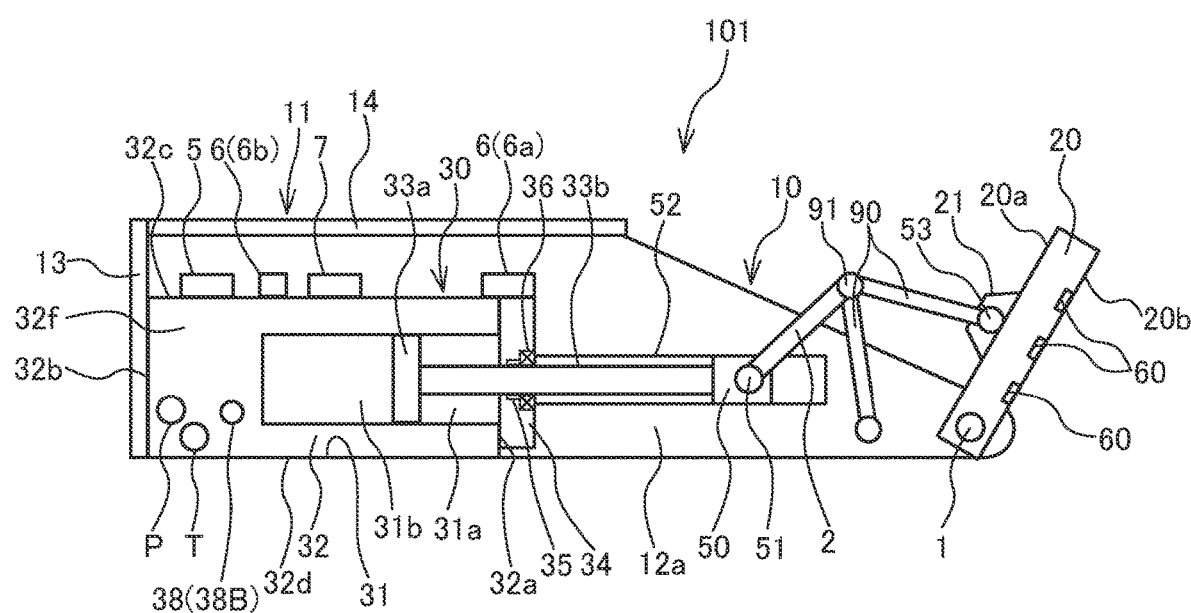
FIG. 10 is a schematic side view of the module according to a modification of the embodiment of the present invention, and is a diagram corresponding to FIG. 1.

(5) In the above-mentioned embodiment, a description has been given of the configuration in which the hydraulic cylinder 30 and the second link 20 are coupled so as to be freely rotatable via the third link 2; however, the coupling method of the hydraulic cylinder 30 and the second link 20 is not limited thereto. For example, as shown in FIG. 10, the first link 10 and the second link 20 may be coupled so as to be freely rotatable via a V-shaped link 90 that is rotated about a rotation shaft 91. In this case, one end of the third link 2 is coupled with the slider 50 so as to be freely rotatable, and the other end of the third link 2 is coupled with the rotation shaft 91 of the V-shaped link 90 so as to be freely rotatable. With this configuration, the rotation shaft 1 for the first link 10 and the second link 20 is positioned at the inner side of the V-shaped link 90, and the angle of the V-shaped link 90 is changed as the first link 10 and the second link 20 are relatively rotated, and therefore, the stroke length of the hydraulic cylinder 30 can be reduced, and thus, it is possible to make the hydraulic cylinder 30 more compact.

(6) In the above-mentioned embodiment, the pump ports P and the tank ports T are formed in three surfaces among the plurality of outer surfaces of the cylinder block 32. However, it suffices that the pump ports P and the tank ports T are formed at least two surfaces among the plurality of outer surfaces of the cylinder block 32. In addition, the pump port P and the tank port T may be formed in the back surface 32d of the cylinder block 32.

(7) In the above-mentioned embodiment, the first supply-discharge port 38A and the second supply-discharge port 38B are each formed in a single surface of the outer surfaces of the cylinder block 32. However, the first supply-discharge port 38A and the second supply-discharge port 38B may be formed in two or more surfaces among the outer surfaces of the cylinder block 32. In addition, in the above-mentioned embodiment, the first supply-discharge port 38A and the second supply-discharge port 38B are formed in different surfaces of the cylinder block 32 from each other. Instead of this configuration, the first supply-discharge port 38A and the second supply-discharge port 38B may be formed in the same surface of the cylinder block 32.

(8) In the above-mentioned embodiment, a description has been given of the configuration in which the first link 10 or the second link 20 of the module 101A is connected to the first link 10 or the second link 20 of the module 101B by using the dowel member having the columnar shape that is forcedly fit into both of the joint hole 60 of the coupling plate 80A and the joint hole 60 of the coupling plate 80B. However, the connecting method of the links of the module 101A and the module 101B is not limited thereto, and for example, the both links may be connected by utilizing an electromagnet or a hydraulic clamp without using the dowel member.

(9) In the above-mentioned embodiment, a description has been given of the configuration in which the coupling plate 80A of the module 101A and the coupling plate 80B of the module 101B are connected with each other by being brought into surface contact.

Instead of this configuration, a spacer may be interposed between the coupling plate 80A of the module 101A and the coupling plate 80B of the module 101B, and the module 101A and the module 101B may be coupled via the spacer. Specifically, the cylinder block 32 of the module 101A and the first link 10 or the second link 20 of the module 101B may be connected via the spacer. By interposing the spacer, it is possible to form a gap between the module 101A and the module 101B.

(10) In the above-mentioned embodiment, a description has been given of the configuration in which the module 101A and the module 101B are coupled such that a relative movement thereof is not allowed. Instead of this configuration, the module 101A and the module 101B may be coupled such that the relative movement is allowed. For example, the module 101A and the module 101B may be coupled via a pin so as to be rotatable or swingable with each other or so as to be rotatable and swingable with each other about the pin. In such a case, it may be possible to provide a motive-power source for mutually rotating and/or swinging the module 101A and the module 101B.

(11) In the above-mentioned embodiment, a description has been given of the configuration in which the control valve for controlling the supply and discharge of the working oil between the pump 3 and the hydraulic cylinder 30 is the servo valve 5. The control valve is not limited to the servo valve 5, and it may be the control valve of a solenoid controlled pilot operated type, etc.

(12) In the above-mentioned embodiment, a description has been given of the configuration in which the module robot 100 is configured by coupling the plurality of modules 101. However, the module robot of the present invention is not limited to those having the configuration in which a plurality of modules are coupled, and the module robot may be configured of a single module.

Figure 11:
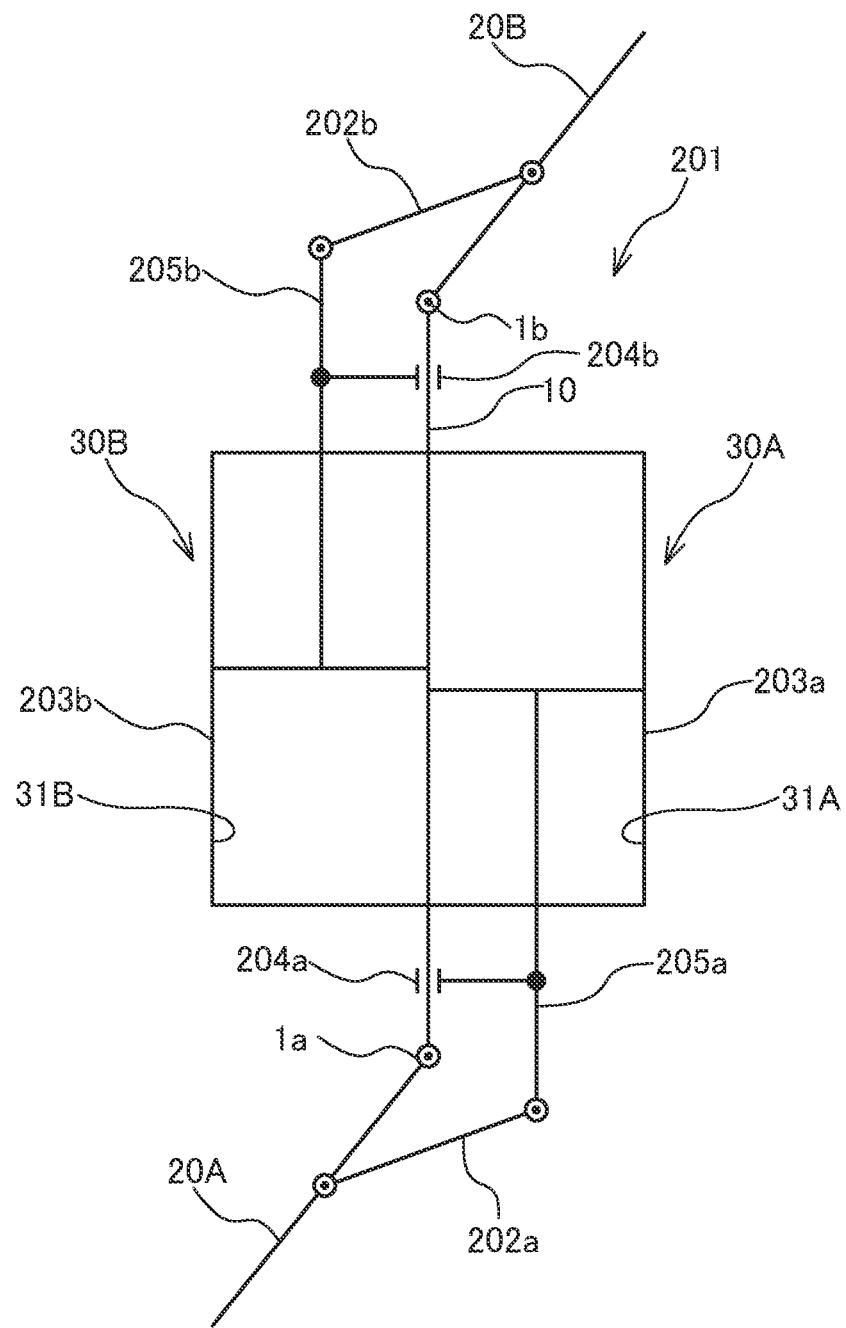
FIG. 11 is a schematic view of the module according to the modification of the embodiment of the present invention.

(13) A module 201 according to a modification of this embodiment will be described with reference to FIG. 11. FIG. 11 is a schematic view of the module 201. The module 201 includes: a second link 20A that is rotatably linked to one end of the first link 10; a second link 20B that is rotatably linked to the other end of the first link 10; a first hydraulic cylinder 30A (the fluid pressure cylinder) that moves the first link 10 and the second link 20A relative to each other; a second hydraulic cylinder 30B (the fluid pressure cylinder) that moves the first link 10 and the second link 20B relative to each other; a third link 202a that is rotatably linked to the second link 20A and a piston rod 205a of the first hydraulic cylinder 30A; and a third link 202b that is rotatably linked to the second link 20B and a piston rod 205b of the second hydraulic cylinder 30B. Linear guides 204a and 204b that respectively guide the linear motion of the piston rods 205a and 205b of the first hydraulic cylinder 30A and the second hydraulic cylinder 30B are provided along the first link 10. The first hydraulic cylinder 30A and the second hydraulic cylinder 30B are coupled with the first link 10 in the opposite orientations from each other, and similarly to the configuration in the above-mentioned embodiment, the first hydraulic cylinder 30A and the second hydraulic cylinder 30B are coupled with the first link 10 so as not to be rotatable. In other words, respective cylinder blocks 203a and 203b of the first hydraulic cylinder 30A and the second hydraulic cylinder 30B configure the part of the first link 10.

As the first hydraulic cylinder 30A is extended/contracted, the first link 10 and the second link 20A are relatively rotated about a rotation shaft 1a, and as the second hydraulic cylinder 30B is extended/contracted, the first link 10 and the second link 20B are relatively rotated about a rotation shaft 1b. As described above, the module 201 has the rotational degree of freedom of two-degrees of freedom about the rotation shafts 1a and 1b, and the module 201 undergoes, as a whole, a two dimensional motion. The module robot may be configured by coupling a plurality of modules 201.

The cylinder block 203a of the first hydraulic cylinder 30A and the cylinder block 203b of the second hydraulic cylinder 30B may be formed integrally. In this case, thus-integrally formed cylinder block is formed with a cylinder chamber 31A of the first hydraulic cylinder 30A and a cylinder chamber 31B of the second hydraulic cylinder 30B that open in a different directions from each other.

Figure 12A:
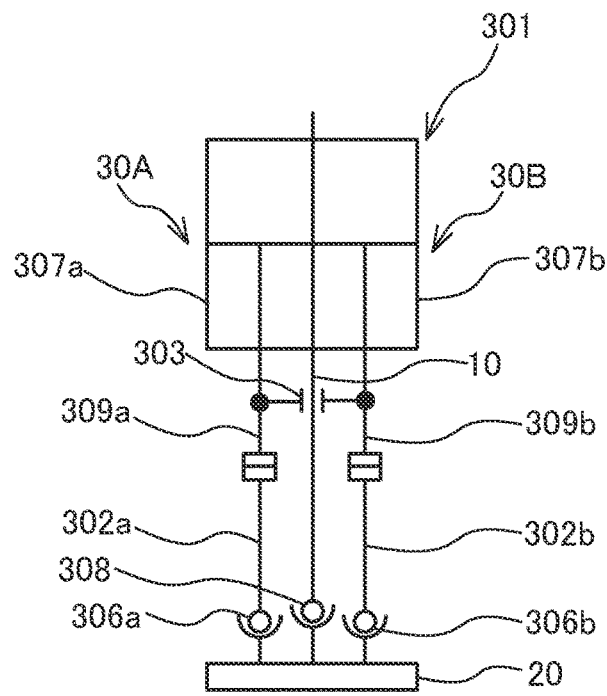
FIG. 12A is a schematic plan view of the module according to the modification of the embodiment of the present invention.
Figure 12B:
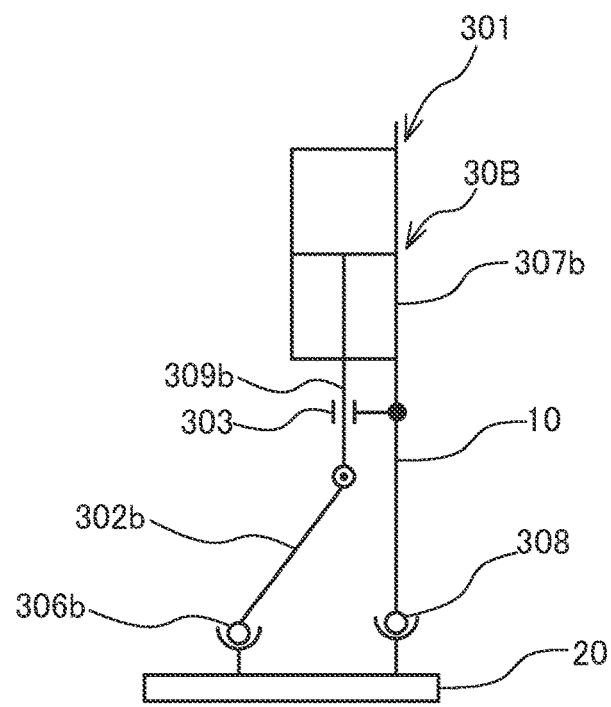
FIG. 12B is a schematic side view of the module according to the modification of the embodiment of the present invention.

(14) A module 301 according to a modification of this embodiment will be described with reference to FIG. 12. FIG. 12A is a schematic plan view of the module 301, and FIG. 12B is a schematic side view of the module 301. The module 301 includes: the first link 10 and the second link 20 that are rotatably linked each other; and the first hydraulic cylinder 30A (the fluid pressure cylinder) and the second hydraulic cylinder 30B (the fluid pressure cylinder) that respectively move the first link 10 and the second link 20 relative to each other. The first hydraulic cylinder 30A and the second hydraulic cylinder 30B are coupled with the first link 10 in the same orientation with each other, and similarly to the configuration in the above-mentioned embodiment, the first hydraulic cylinder 30A and the second hydraulic cylinder 30B are coupled with the first link 10 so as not to be rotatable. In other words, respective cylinder blocks 307a and 307b of the first hydraulic cylinder 30A and the second hydraulic cylinder 30B configure the part of the first link 10.

The first link 10 and the second link 20 are rotatably linked each other via a ball joint 308 in any direction. The module 301 further includes a pair of third links 302a and 302b. One ends of the third links 302a and 302b are respectively rotatably linked to piston rods 309a and 309b of the first hydraulic cylinder 30A and the second hydraulic cylinder 30B. Other ends of the third links 302a and 302b are respectively rotatably linked to the second link 20 via ball joints 306a and 306b in any direction. A linear guide 303 that guides the linear motions of the piston rods 309a and 309b of the first hydraulic cylinder 30A and the second hydraulic cylinder 30B is provided along the first link 10.

When the first hydraulic cylinder 30A and the second hydraulic cylinder 30B are extended/contracted in the opposite directions from each other, the second link 20 is rotated about the ball joint 308 when viewed in the front view as shown in FIG. 12A. Specifically, when the first hydraulic cylinder 30A is contracted and the second hydraulic cylinder 30B is extended, the second link 20 is rotated in the clockwise direction about the ball joint 308 when viewed in the front view as shown in FIG. 12A. When the first hydraulic cylinder 30A is extended and the second hydraulic cylinder 30B is contracted, the second link 20 is rotated in the anti-clockwise direction about the ball joint 308 when viewed in the front view as shown in FIG. 12A. On the other hand, when the first hydraulic cylinder 30A and the second hydraulic cylinder 30B are extended/contracted in the same direction with each other, the second link 20 is rotated about the ball joint 308 when viewed in the side view as shown in FIG. 12B. Specifically, when the first hydraulic cylinder 30A and the second hydraulic cylinder 30B are extended, the second link 20 is rotated in the clockwise direction about the ball joint 308 when viewed in the side view as shown in FIG. 12B. When the first hydraulic cylinder 30A and the second hydraulic cylinder 30B are contracted, the second link 20 is rotated in the anti-clockwise direction about the ball joint 308 when viewed in the side view as shown in FIG. 12B. As described above, the module 301 has the rotational degree of freedom of two-degrees of freedom about two mutually perpendicular axes, and the module 301 undergoes, as a whole, a three dimensional motion. The module robot may be configured by coupling a plurality of modules 301.

(15) In the above-mentioned embodiment, a description has been given of the configuration in which the hydraulic cylinder 30 serves as the liquid pressure cylinder in which the working oil is used as the working liquid; however, instead of using the working oil, other fluids such as working water, etc. may also be used as the working fluid. In addition, instead of using the hydraulic cylinder 30, a pneumatic cylinder driven by compressed air may also be used. In other words, it suffices to use the fluid pressure cylinder as the actuator that moves the first link 10 and the second link 20 relative to each other.

Figure 13:
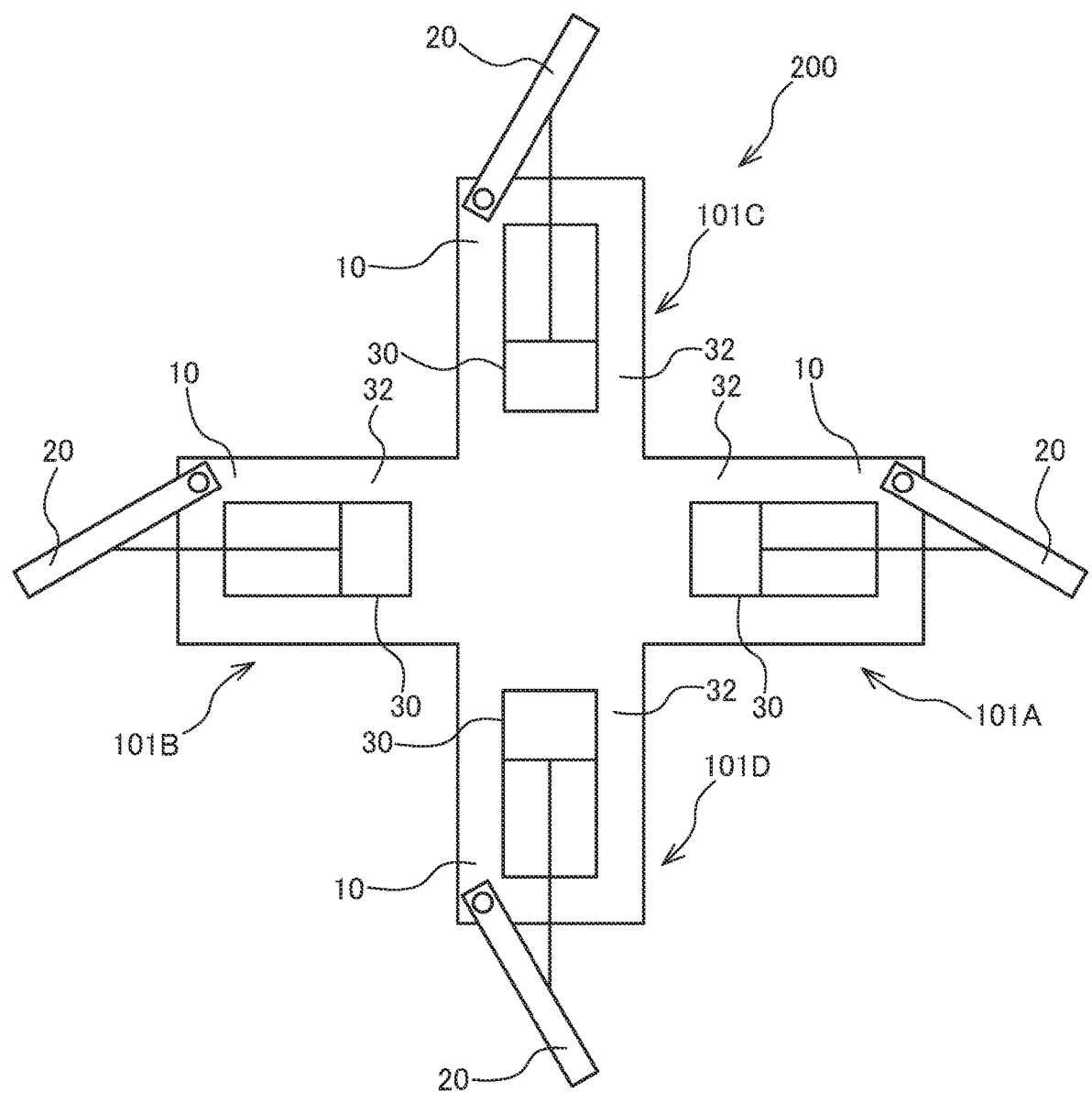
FIG. 13 is a schematic plan view of the module robot according to the modification of the embodiment of the present invention.

(16) A module robot 200 according to a modification of this embodiment will be described with reference to FIG. 13. In the above-mentioned embodiment, a description has been given of the configuration in which the modules 101 are coupled with each other via the joint tool. Instead of this configuration, in the module robot 200, the modules 101 are formed such that modules 101 are partially integrated. The module robot 200 is configured of four modules 101A, 101B, 101C, and 101D. The cylinder blocks 32, which are parts of the four modules 101A, 101B, 101C, and 101D, are integrally formed. In other words, the cylinder blocks 32 of the four modules 101A, 101B, 101C, and 101D are formed as a common component. Furthermore, as shown in FIG. 13, the first links 10 of the four modules 101A, 101B, 101C, and 101D may also be formed integrally with the cylinder blocks 32. The module robot 200 has four-degree of freedom by being configured with the four modules 101A, 101B, 101C, and 101D. Two modules may respectively be integrally formed on the module robot 200 in the above and below direction perpendicular to the plane of the drawing for FIG. 13, and thereby, the module robot having six-degree of freedom may be achieved. In addition, a plurality of module robots 200 may be coupled via the joint tool.

The configurations, operations, and effects of the embodiment of the present invention will be collectively described below.

The module robot 100 includes: the first link 10; the second link 20 rotatably linked to the first link 10; and the hydraulic cylinder 30 (the fluid pressure cylinder, the liquid pressure cylinder) configured to move the first link 10 and the second link 20 relative to each other, wherein the first link 10 has the cylinder block 32 in which the cylinder chamber 31 of the hydraulic cylinder 30 is formed.

With this configuration, because the cylinder block 32, in which the cylinder chamber 31 of the hydraulic cylinder 30 is formed, configures the part of the first link 10, it is possible to obtain the module 101 with a simple structure, the number of components of which is reduced. Thus, it is possible to obtain the module robot 100 with a simple structure.

The module robot 100 is configured by coupling the plurality of modules 101, the modules 101 each has the first link 10, the second link 20 and the hydraulic cylinder 30, and the two modules 101A and 101B are coupled by connecting the first link 10 or the second link 20 of the first module 101A with the first link 10 or the second link 20 of the second the module 101B, the first module 101A being one of two modules 101A and 101B, and the second the module 101B being other of two modules 101A and 101B. Here, the cylinder block 32 of the first module 101A is connectable with the first link 10 or the second link 20 of the second the module 101B.

With this configuration, when the plurality of modules 101 are to be coupled to configure the module robot 100, it is possible to use the cylinder block 32 configuring the part of the first link 10 to connect the first link 10 with the second link 20.

In addition, the module robot 200 is configured of the plurality of modules 101, the modules 101 being formed so as to be partially integrated.

With this configuration, it is possible to save the time to couple the modules 101 with each other via the joint means.

In addition, the pump port P connectable to the pump 3 (the liquid pressure source) and the tank port T connectable to the tank 4 are formed in at least two surfaces among the plurality of outer surfaces of the cylinder block 32.

With this configuration, in accordance with the coupling mode of the modules 101, it is possible to use the best suitable pump port P and tank port T.

In addition, the cylinder block 32 is formed with the oil passages 37 configured to connect the pump ports P and the tank ports T with the cylinder chamber 31.

With this configuration, because the cylinder block 32 is formed with, in addition to the cylinder chamber 31, the oil passage 37 configured to connect the pump ports P and the tank ports T with the cylinder chamber 31, there is no need to provide piping to be connected to the cylinder chamber 31, and it is possible to make the module 101 to have a simple structure.

In addition, the pump port P connectable to the pump 3 (the liquid pressure source) and the tank port T connectable to the tank 4 are formed in at least two surfaces among the plurality of outer surfaces of the cylinder block 32, and the module 101 further has: the sensor 6 (the state-quantity detector) configured to detect the state quantity of the module 101; the servo valve 5 (the control valve) configured to control communication between the cylinder chamber 31 and the pump port P and the tank port T; and the controller 7 configured to control the motion of the module 101 by controlling the operation of the servo valve 5 on the basis of the detection result from the sensor 6.

With this configuration, it is possible to individually control the motion of the module 101.

In addition, the supply-discharge port 38 selectively connectable to the pump 3 and the tank 4 is formed in the outer surface of the cylinder block 32, and the cylinder block 32 is formed with the oil passage 39 configured to connect the supply-discharge port 38 with the cylinder chamber 31.

With this configuration, in accordance with the mode of the module robot 100, it is possible to appropriately select the use of the pump ports P and the tank ports T and the use of the supply-discharge ports 38.

In addition, the module robot 100 is configured by coupling at least two of the modules 101, the modules 101 being identical.

With this configuration, it is possible to manufacture the module robot 100 with a lower cost.

In addition, the cylinder block 32 of the first module 101A is formed with the joint hole 60 into which the joint tool is inserted, the joint tool being configured to connect the cylinder block 32 with the first link 10 or the second link 20 of the second module 101B.

With this configuration, because the cylinder block 32 configures the part of the first link 10, it is possible to achieve the module 101 with a simple structure, the number of components of which is reduced.

Embodiments of this invention were described above, but the above embodiments are merely examples of applications of this invention, and the technical scope of this invention is not limited to the specific constitutions of the above embodiments.

This application claims priority based on Japanese Patent Application No. 2020-167735 filed with the Japan Patent Office on Oct. 2, 2020, the entire contents of which are incorporated into this specification.

The invention claimed is:

1. A modular robot, comprising
a plurality of modules that are coupled together, wherein each of the plurality of modules includes:
a first link;
a second link movably linked to the first link; and
a liquid pressure cylinder configured to move the first link and the second link relative to each other by a working fluid that is supplied to a cylinder chamber from a liquid pressure source located outside the plurality of modules and is discharged from the cylinder chamber to a tank located outside the plurality of modules, wherein
the first link includes a cylinder block in which the cylinder chamber of the liquid pressure cylinder is formed, the cylinder block having a plurality of outer surfaces, and at least two of the plurality of outer surfaces of the cylinder block each have both a pump port connectable to the liquid pressure source and a tank port connectable to the tank.

2. The modular robot according to claim 1, wherein the plurality of modules includes a first module and a second module that are coupled by connecting the first link or the second link of the first module to the first link or the second link of the second module.

3. The modular robot according to claim 2, wherein the cylinder block of the first module is connectable to the first link or the second link of the second module.

4. The modular robot according to claim 3, wherein the cylinder block of the first module has a joint hole into which a joint tool is inserted, the joint tool being configured to connect the cylinder block of the first module to the first link or the second link of the second module.

5. The modular robot according to claim 2, wherein the first and second modules are identical to each other.

6. The modular robot according to claim 1, wherein the plurality of modules are partially integrated.

7. The modular robot according to claim 1, wherein the cylinder block includes a supply passage connecting the pump port to the cylinder chamber and a discharge passage connecting the tank port to the cylinder chamber.

8. The modular robot according to claim 1, wherein each module further includes:
a state-quantity detector configured to detect a state quantity of the module;
a control valve configured to control communication between the cylinder chamber, and one of the pump ports and one of the tank ports of the at least two of the plurality of outer surfaces of the cylinder block; and
a controller configured to control motion of the module by controlling operation of the control valve based on a detection result from the state-quantity detector.

9. The modular robot according to claim 8, wherein in each module, the state quantity detected by the state-quantity detector is at least one of a stroke amount of the liquid pressure cylinder, a relative rotational angle between the first link and the second link thereof, a pressure in the liquid pressure cylinder, a load acting on the liquid pressure cylinder, a stroke speed of the liquid pressure cylinder, or a flow amount of the working fluid supplied to the liquid pressure cylinder.

10. The modular robot according to claim 1, wherein, at least one of the plurality of outer surfaces of the cylinder block has at least two supply-discharge ports in total, one of which is selectively connectable to one of the liquid pressure source or the tank, and another one of which is selectively connectable to the other one of the liquid pressure source or the tank, and
the cylinder block includes at least two passages, respectively connecting respective ones of the at least two supply-discharge ports to the cylinder chamber.

11. The modular robot according to claim 10, wherein the at least two supply-discharge ports are different from the pump and tank ports in each module.

* * * * *